United States Patent [19]

Berg

[11] Patent Number: 4,687,524
[45] Date of Patent: Aug. 18, 1987

[54] METHOD OF FORMING TO A FINISHED SIZE VEHICLE WHEELS MADE OF A HEAT-TREATABLE ALUMINUM ALLOY

[75] Inventor: Otto Berg, Asker, Norway

[73] Assignee: Ardal OG Sunndal Verk A.S., Oslo, Norway

[21] Appl. No.: 802,220

[22] Filed: Nov. 26, 1985

[30] Foreign Application Priority Data

Nov. 27, 1984 [DE] Fed. Rep. of Germany ....... 3443227

[51] Int. Cl.$^4$ .............................................. C22F 1/04
[52] U.S. Cl. ........................... 148/11.5 A; 148/12.7 A
[58] Field of Search ....................... 148/11.5 A, 12.7 A

[56] References Cited

U.S. PATENT DOCUMENTS 3,172,787  3/1965  Martenet ......................... 148/11.5 A Primary Examiner—R. Dean
Attorney, Agent, or Firm—Wenderoth, Lind & Ponack

[57] ABSTRACT

An aluminum alloy wheel rim is formed to a desired finished size by pressing a sheet of aluminum alloy material to form a wheel rim having a diameter less than, but not smaller than 98.7% of, the desired finished size. The wheel rim then is subjected to a solution heat treatment operation and thereby is expanded to a diameter of a size greater than the desired finished size. The wheel rim then is positioned, while substantially at the temperature thereof when removed from the solution heat treatment, in a calibration tool in the form of two dies on a common arbor, with the dies being located to define the desired finished size. The wheel rim then is cooled to cause the rim to shrink tightly onto the dies to the desired finished size without the necessity of applying pressure to the rim.

3 Claims, No Drawings

METHOD OF FORMING TO A FINISHED SIZE VEHICLE WHEELS MADE OF A HEAT-TREATABLE ALUMINUM ALLOY

BACKGROUND OF THE INVENTION

The invention relates to a method of calibrating to a desired finished size vehicle wheels made of heat-treatable aluminum sheet.

Vehicle wheels for pneumatic tires are manufactured primarily of steel and in the form of a compound unit consisting of a wheel disk and a rim. The wheel must meet certain conditions with regard to the diameter, circumference, width, depth, and straightness of the rim. After the rim has been formed by rolling, it is fitted onto the wheel disk. Usually, this is accomplished with an expansion die, or alternatively, first with an expansion die which expands the rim further than the required size, and then by compression strain, whereby the rim is pressed onto the wheel disk. This method is less suitable for wheels made of a single piece, e.g., cast or forged aluminum wheels, especially since these wheels are already manufactured with lower tolerances in terms of roundness compared to conventional steel wheels. Therefore, the rims of cast or forged aluminum wheels are frequently cut down to the exact circumferential dimension required to maintain the relatively close tolerances.

In the manufacture of single-piece aluminum wheels by effecting a pressing thereof, it is desirable to preserve the rim in the form in which it was pressed, that is, without calibration to the finished size. For this, cost considerations are on the one hand an essential criterion, but, on the other hand, also much is to be said for the advantageous properties of the metal on the surface produced by pressing. Pressing results in a very uniform distribution of the worked material in the rim and in an extraordinary roundness, which means a slight imbalance. However, subsequent heat treatment can lead to certain changes of shape.

Solution heat treatment such as, for example, described in "Robert B. Ross, Handbook of Metal Treatments and Testing", London, pp. 206–208, is known for improving the material properties of various alloys, including aluminum alloys.

The application of solution heat treatment to wheel rims, too, also has been described in U.S. Pat. No. 3,172,787 in which wheel rims are made of a continuously cast aluminum profile by appropriate rounding and welding. After completion of the welding seam, the rims are solution heat treated, then calibrated to the finished size and configuration in a die. However, this prior art method involves great complexity.

DESCRIPTION OF THE INVENTION

Accordingly, the object of the present invention is the provision of a calibration method whereby a dimensionally correct change of form occurs in conjunction with the solution heat treatment.

The method incorporating the invention is distinguished by the fact that the wheels are made slightly smaller than their theoretical size by effecting a pressing thereof and are then solution heat treated and calibrated to the finished size while being cooled, using a calibration tool made up of at least two dies which are located on a common arbor and which determine the theoretical desired finished diameter.

The method of the invention results in a uniform deformation of the rim.

The use of thermal expansion during the solution heat treatment with subsequent contraction has the advantage that the two manufacturing steps can be combined. The calibration process takes place by positioning the wheel over a die for shrinking purposes as it is being cooled down from the temperature from the solution heat treatment. The rim is then capable of assuming the diameter and the configuration of the die within very close tolerances. In order to carry out this process, a tool is required consisting of two dies on a common arbor for the calibration or the fitting of the rim onto the edge of the wheel disk. Moreover, the calibration tool is shaped in such a way that the surface of the wheel disk that is presumed to bear against the brake drum lies in the proper position relative to the rim.

A wheel consisting of a rim and a disk is made of a piece of metal by effecting a pressing thereof in such a manner that the diameter of the rim is slightly smaller than the size required for the finished product. However, the diameter shall not be smaller than 98.7% of the size of the finished product. During heating for the solution heat treatment, e.g. to 550° C., the rim expands in accordance with the thermal expansion coefficient of the wheel material. In practice, this results in an expansion value of approximately 1.3% for the aforesaid temperature. After the solution heat treatment, the wheel is removed and placed in a calibration fixture which in the present invention comprises two dies located on a common arbor. These dies are placed in the required position when the wheel is cooled down to a required temperature by spraying it with water. During this process, the rim shrinks enough to be calibrated to the desired finished size by clamping tightly onto the dies. Wheels thus sized have an exact diameter and a roundness within very close tolerances. The method has a number of distinct advantages, including the fact that the heat generated by the solution heat treatment is utilized for combining the expansion and calibrating operations in order to reduce the number of manufacturing steps.

Accordingly, the invention is concerned with a method of calibrating to a desired finished size vehicle wheels made of a heat-treatable aluminum sheet. The wheel is manufactured by a pressing operation to a size slightly below the desired finished size. While still hot from the solution heat treatment, the wheel is placed in a calibration tool formed of one or more dies on a common arbor. These dies are so dimensioned that the wheels shrink to the correct diameter after cooling.

We claim:

1. A method of forming an aluminum alloy wheel rim to a desired finished size, said method comprising:
    pressing a sheet of aluminum alloy material to form a wheel rim having a diameter less than, but not smaller than 98.7% of, said desired finished size;
    subjecting said wheel rim to a solution heat treatment operation and thereby expanding said diameter to a size greater than said desired finished size;
    positioning said wheel rim, while substantially at the temperature thereof when removed from the solution heat treatment, in a calibration tool comprising two dies on a common arbor, said dies being located to define said desired finished size; and
    cooling said wheel rim and thereby causing said rim to shrink tightly onto said dies to said desired finished size.

2. A method as claimed in claim 1, wherein said cooling comprises spraying a cooling medium onto said wheel rim.

3. A method as claimed in claim 2, wherein said cooling medium comprises water.